United States Patent [19]

Upham

[11] 4,209,037
[45] Jun. 24, 1980

[54] ENVIRONMENTAL CHECK VALVE

[75] Inventor: Neil R. Upham, Jackson, Mich.

[73] Assignee: Aeroquip Corporation, Jackson, Mich.

[21] Appl. No.: 854,525

[22] Filed: Nov. 25, 1977

[51] Int. Cl.² ............................................. F16K 15/03
[52] U.S. Cl. .................................... 137/527; 137/512
[58] Field of Search .............. 137/512, 512.1, 527, 137/527.6, 527.2, 527.4, 527.8; 251/149.2, 212

[56] References Cited

U.S. PATENT DOCUMENTS

| | | | |
|---|---|---|---|
| 586,618 | 7/1897 | Noll | 137/527 |
| 2,767,735 | 10/1956 | Darling | 137/527 |
| 3,127,148 | 3/1964 | Collar | 251/149.2 |
| 3,395,727 | 8/1968 | Weise et al. | 137/527 X |
| 4,007,909 | 2/1977 | Buseth et al. | 251/149.2 |

Primary Examiner—William R. Cline
Attorney, Agent, or Firm—Collins, Oberlin & Darr

[57] ABSTRACT

A check valve with a mounting ring body defining an orifice and having valving means comprising two pivotal valve members mounted on one face thereof. Each valve member is configured to comprise a segment of a cone which is movable between a closed and an open position over the orifice by the flow of fluid. The strength of the valve members and the flow of fluid therethrough when the valve members are in their open position is maximized by providing the concave inner surface of each valve member with an ellipsoidal segment form. The mounting ring body is also provided with stops against which the valve members abut in their open position for reducing fluttering thereof during fluctuating flow rates and resulting surges in fluid pressure.

5 Claims, 5 Drawing Figures

ENVIRONMENTAL CHECK VALVE

BACKGROUND OF THE INVENTION

1. Field of the Invention

This invention generally relates to check valves and more particularly to check valves having a pair of pivotal valve members for controlling the flow of fluids therethrough.

2. Description of the Prior Art

While the invention has features that make it applicable for many purposes in various fields, the present disclosure is directed particularly to the passing of heated, compressed air through ducts to start jet aircraft engines. One method of starting a jet aircraft engine consists of furnishing substantial volumes of air at relatively high pressure and temperature to a turbine starter which brings the jet engine up to the speed necessary for its ignition. The air is conventionally supplied to the turbine starter through a duct system having an input nipple accessible from the exterior of the engine cowling and through a check valve for preventing the loss of fluid pressure from the duct system.

One of the most serious problems confronting the check valves used in such systems is that they are subjected to relatively high temperatures and pressures in moving large volumes of heated air, wherein the strength of the valve members is critical and yet their weight must be minimal. Usually such valve members are formed from thin metal sheets and thus they are easily warped or otherwise distorted by the heated compressed air, resulting in failure of the check valve after a short period of use.

SUMMARY OF THE INVENTION

In the practice of this invention, the check valve basically consists of a mounting ring bodily defining an orifice and having two pairs of posts projecting from one side of the ring body, each pair of posts being located adjacent the orifice and diametrically opposed to the other. A valve member is pivotally mounted on each pair of posts and it is moved by the flow of fluid between closed and open positions. The valve members, in their closed position, comprise a cone whose concave surface is of an ellipsoidal segment form when viewed in a plane lying transversely of and normal thereto. Each pair of the pairs of posts is also provided with a retainer which mounts one end of a torsion spring and further serves as a stop for its associated valve member when it is in its open position. The other end of the torsion spring bears against the valve member 10 tending to bias it to its closed position.

The special configuration of the valve members is particularly adapted to members of high strength and low weight which have an extended life span when compared to the "butterfly" type check valves presently used in the above-described system. Further, the valve configuration comtemplated by the invention produces equal loading on the interfaces between the valve-valve and the valve-seat sealing surfaces.

OBJECTS AND ADVANTAGES

An object of the invention is to provide a novel check valve which restricts the flow of fliud from a duct system and admits the flow of fluid into the duct system.

Another object of the invention is to provide a novel check valve of the clamshell type wherein the configuration of the valve members promotes high strength, low weight and equal loading on the valve-valve and the valve-seat sealing interfaces.

A further object of the invention is to provide a novel check valve of the clamshell type wherein the pivoting valve members are moved from a closed position to an open position by a predetermined minimum fluid flow and when in open position provide a full, unobstructed fluid flow therethrough.

Yet another object of the invention is to provide a novel check valve of the clamshell type with a stop that reduces fluttering of the valve members in their open position during impulse type, opening fluid flows.

A still further object of the invention is to provide a novel check valve of the clamshell type that is simple in construction, economical to manufacture, efficient in operation and that is positive in action for opening its passage for full, unobstructed fluid flow and closing its passage for terminating fluid flow.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
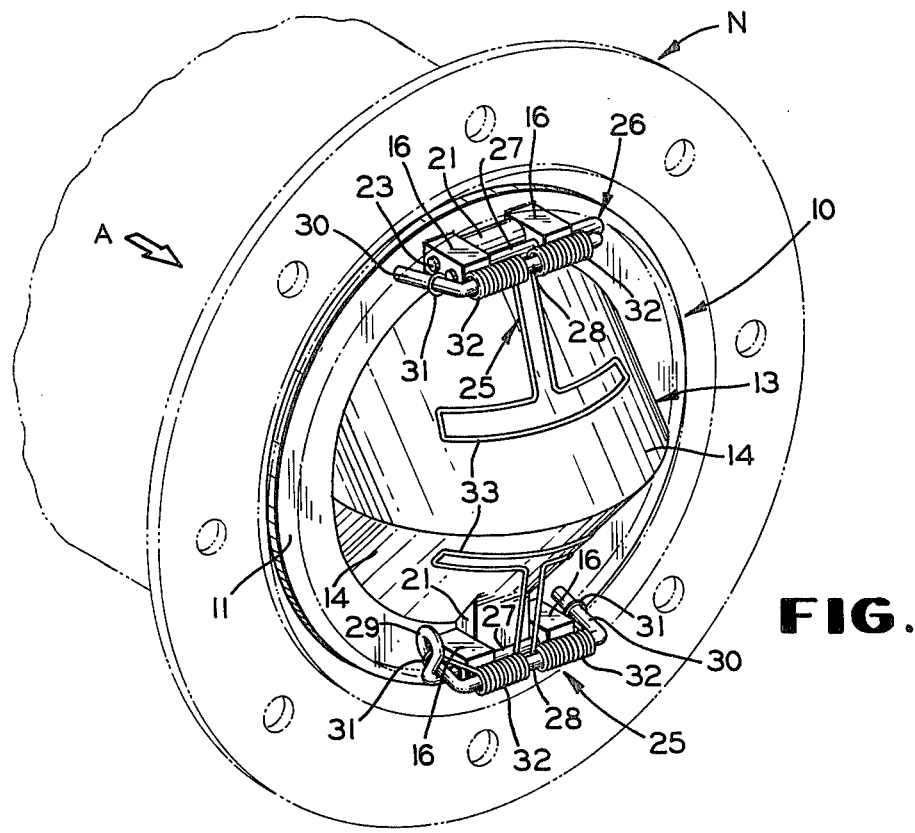
FIG. 1 is a perspective view of a check valve constructed in accordance with the invention and illustrated in conjunction with an input nipple, shown in phantom, of a typical installation.

Referring now to the drawings, and particularly to FIG. 1, there is illustrated a check valve indicated generally by the reference numeral 10 and constructed in accordance with the invention. As there shown, the check valve 10 is installed at the output end of an input nipple N shown in phantom as it forms no part of the invention. Briefly, the check valve 10 includes a mounting ring or annular body 11 having a central orifice 12 (see FIG. 2) over which valving means, designated in its entirety by the reference numeral 13 and generally comprising a pair of spring biased valve members 14,14, is pivotally mounted for selectively controlling the flow of fluid in the direction of arrow A through the orifice 12.

One face 15 of the ring body 11 is provided with two pairs of axially projecting spaced apart posts 16,16 which pairs are located adjacent the orifice 12 in diametrically opposed relationship to each other. The surface of the face 15 is finished to provide an annular, planar sealing seat for the valve members 14,14. Each post 16 is provided with pairs of aligned apertures 17 and 18 (see FIG. 3), the purpose of which will be described hereinafter.

Figure 2:
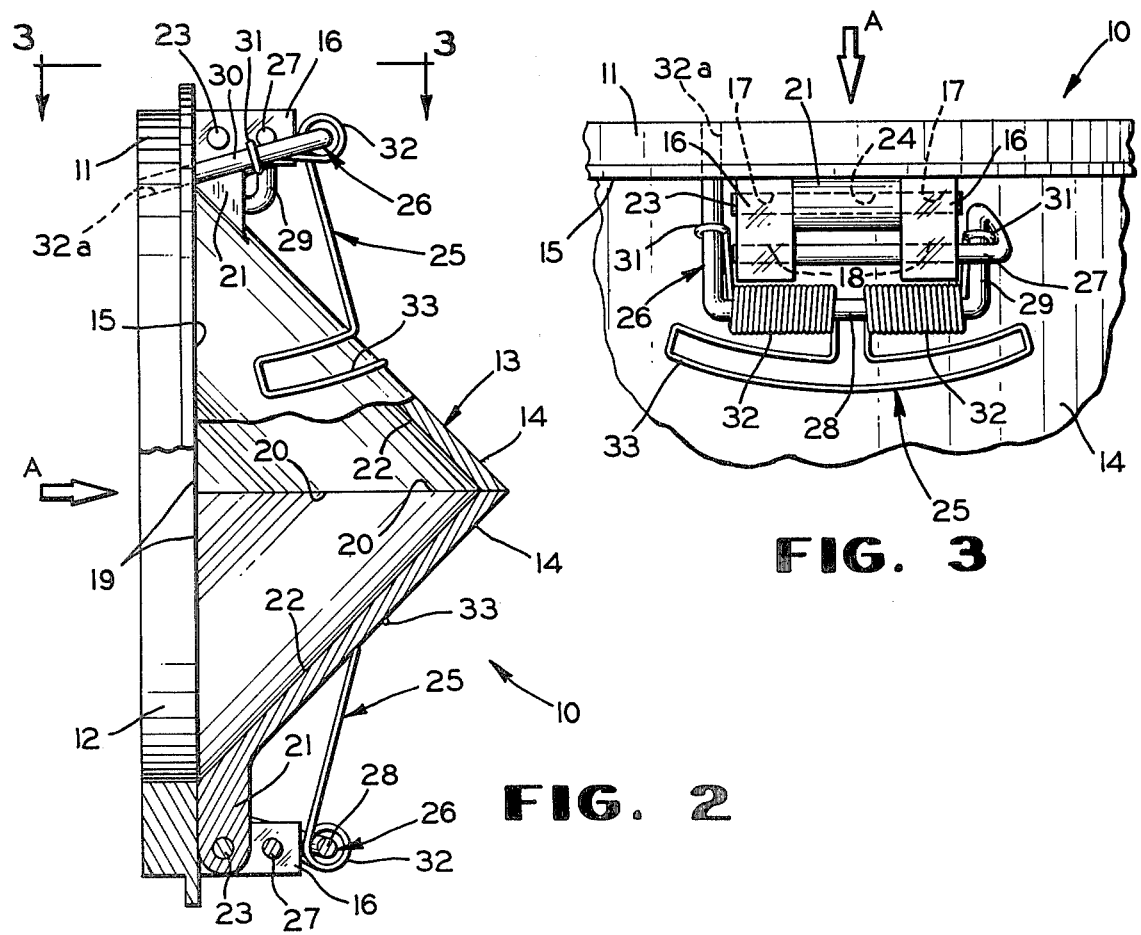
FIG. 2 is an axial view, partially in section, illustrating the valve in its closed position.
Figure 4:
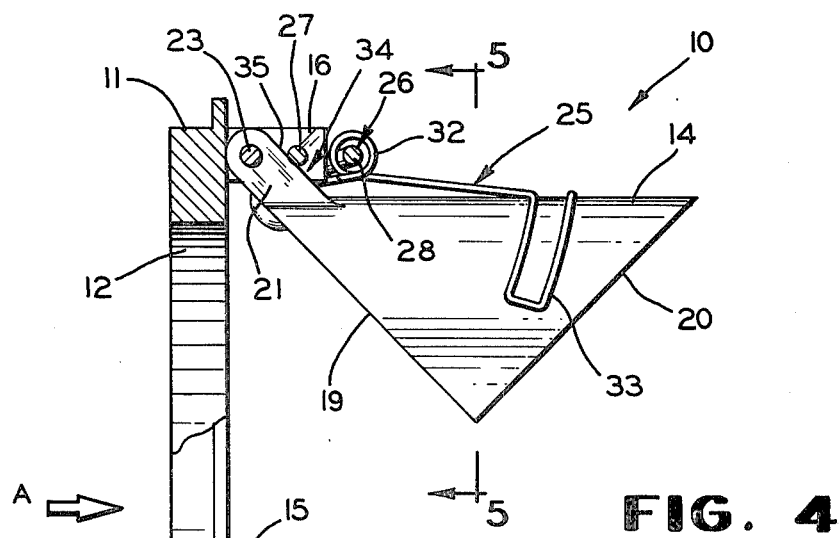
FIG. 4 is an axial view, partially in section, illustrating the valve in its open position.

As seen in the closed position in FIGS. 1 and 2 and in the open position in FIG. 4, the pair of valve members 14,14 are mirror images of each other. Accordingly, a description of one will suffice for the other. As best illustrated in FIGS. 1 and 2, each valve member 14 is of a semi-conical or tapered configuration having a planar seating or downstream edge 19 and an axially extending planar mating seating edge 20, these edges lying in planes perpendicular to each other. thus, a pair of the valve members 14,14, in their closed position, define a generally conical or tapered structure. Each valve member 14 is provided with a boss 21 projecting radially outwardly at substantially the midpoint of its seating or downstream edge 19.

Figure 5:
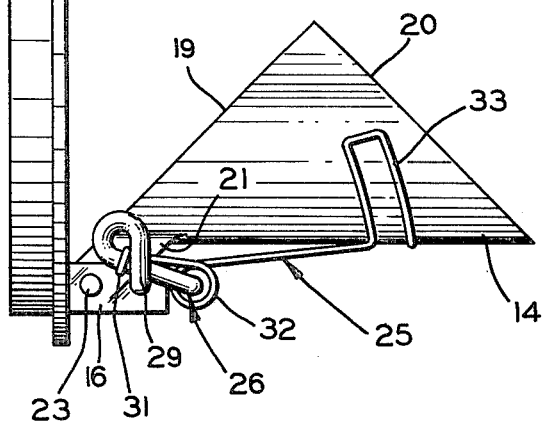
FIG. 5 is a fragmentary, sectional view taken substantially along line 5—5 in FIG. 4.

As previously mentioned, the high strength and low weight of the valve members 14,14 are critical to their efficient operation and use. It has been discovered that when the concave inner surface 22 of the valve member 14 is configured in the form of an ellipse lying in the plane transversely of and normal to the inner surface 22 as shown in FIG. 5, the valve member will have a high strength to weight ratio. A valve member of such configuration may be conveniently formed by die casting. An advantage of the conical-ellipsoidal shaped valve members 14,14 is that they provide a circular configuration at the interfaces between the seating surfaces of the ring face 15 and their downstream seating edge 19, as well as a semi-circular configuration at the interfaces between their mating edges 20,20, thus providing excellent sealing characteristics. Further, as illustrated in FIG. 5, the elliptical cross-sectional shape of the valve members 14,14 allows them to be completely out of the fluid flow path of the orifice 12 in their full open position.

Figure 3:
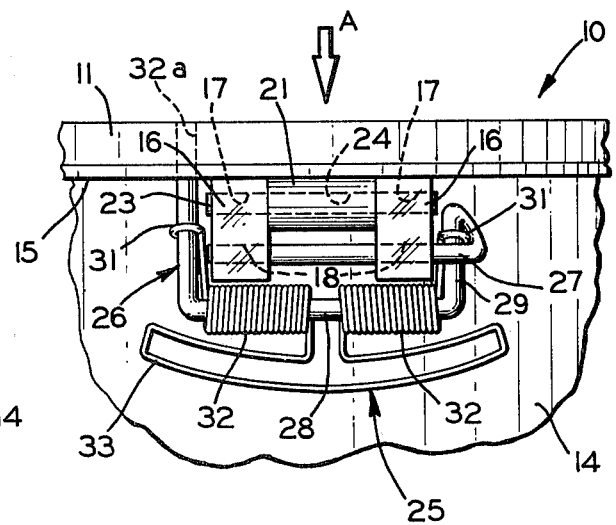
FIG. 3 is a fragmentary view of the valve looking in the direction of line 3—3 of FIG. 2.

Each of the valve members 14,14 is pivotally hinged to the ring body 11 by a pivot pin 23 which extends through the aligned apertures 17 provided in the posts 16 and an aperture 24 extending through the boss 21 which is aligned with the apertures 17 (see FIG. 3).

Referring to FIG. 1, a novel arrangement is provided for mounting a torsion spring 25 to bear against each of the valve members 14,14, which tends to urge them toward their closed position. This mounting arrangement provides means for easily changing the springs 25 and/or for varying the biasing force thereof when required by vibrations of the system in which the check valve 10 is installed. Accordingly, a retainer 26 is mounted on each pair of the posts 16 and extends axially forwardly of the ends of the posts.

As best illustrated in FIG. 3, the retainer 26 is configured to have a first, transversely extending linear section 27 which extends through the aligned apertures 18 provided in the posts 16 and a second linear section 28 lying axially forwardly of the ends of the posts 16 and parallel to the first section 27. The retainer may be formed of a stiff wire wherein a portion 29 joining the first and second sections is bent back beneath the end of the first section 27. A portion 30 at the free end of the second section 28 is bent back at a right angle to extend through a hole 30a provided in the ring body 11 for preventing rotation of the retainer 26 about its section 27 extending through the aligned apertures 18 in the posts 16.

Still referring to FIG. 3, each end 31 of the torsion spring 25 bears against the portions 29 and 30 of the retainer 26 and has a pair of portions 32 wrapped around the second section 28 of the retainer 26, the wrapped portions 32 being joined together in a T-shaped configuration 33 bearing against the central area of the valve member 14 for imposing the aforementioned biasing force thereagainst.

As previously indicated, the check valve 10 is provided with a stop 34 against which the valve members 14,14 abut in their full, open position for reducing fluttering thereof during opening fluctuating fluid flow rates and resulting surges in fluid pressure. Specifically, as illustrated in FIG. 4, the axial spacing between the valve pivot pins 23 and the first section 27 of the retainer 26 is arranged so that a face 35 of the boss 21 engages the central, open portion of the first section 27 of the retainer 26 when the valve members 14,14 are in their full open position.

In operation, when the flow of fluid is in the direction of arrow A, the fluid pressure will create forces acting on the inner surfaces 22 of the valve members 14,14 in downstream relation to the pivot axes of the pins 23, creating a moment of force to swing the valve members open sufficiently, up to their fully open position against the stops 34 as shown in FIG. 4, to permit passage of the fluid. The spring biasing force is easily overcome by the forces of the flowing fluid applied to the area of the valve members and its spacing from the pivot axes of the valve members. As best illustrated in FIG. 5, when the valve members, 14,14 are in their full open position there is free, unobstructed flow through the orifice 12 and, due to their shape and the arrangement of their surfaces relative to the pivot axes, it will be apparent that the valve members will move substantially instantaneously in either direction with relatively small differential pressures.

When the fluid flow is stopped, or if any reverse flow of fluid should occur, the springs 25 will start to move the valve members 14,14 to their orifice closing position. The springs 25, together with any reversal of fluid pressure, will complete the closing of and then hold the valve members 14,14 in closed position with their interfaces in sealing engagement with each other as well as the body member.

It is to be understood that the form of the invention herewith shown and described is to be taken as an illustrative embodiment of the same, and that various changes in the shape, size and arrangement of the parts may be resorted to without departing from the spirit of the invention.

I claim:

1. A check valve for use in fluid flow ducts, comprising:
   a. a mounting ring body having a central orifice;
   b. two pairs of diametrically opposed axially extending posts projecting from one face of said ring body and disposed adjacent said orifice;
   c. a pair of valve members hingedly mounted one on each said pair of posts adjacent said ring body and pivotable between closed and open positions over said orifice, each said valve member comprising a semi-conical segment having a concave inner surface whose intersection with a plane extending transversely of and normal to said concave inner surface is of elliptical form;
   d. means for pivotally hinging each said valve member to its associated pair of posts;
   e. a retainer mounted on each said pair of posts outwardly of said hinging means, each said retainer having a first section mounted on said posts against which said valve members abut in the open position and a second section disposed axially outwardly of the end of said posts; and f. a torsion spring mounted on said second section of each said retainer and bearing against its associated valve member.

2. A check valve for fluid flow ducts as claimed in claim 1, wherein each said valve member includes a boss extending between the posts of each said pair of posts and a face of said boss abuts said first section of said retainer when said valve members are in their open position.

3. A check valve for use in fluid flow ducts comprising:
   a. an annular body having a central orifice for permitting fluid to flow therethrough;
   b. a pair of valve members hingedly mounted on a face of said body over said orifice and pivotable between closed and open positions, each said valve member comprising a semi-conical segment having a concave inner surface generated in an ellipsoidal form as defined by its intersection with a plane extending transversely of and normal to said surface;
   c. means for pivotally hinging each said valve member to said body member, said hinging means including a boss projecting outwardly of the midpoint of the seating edge on each said valve member;
   d. a retainer for each said valve member mounted on said body member and positioned axially outward of said hinging means, said retainer having a first section and a second section;
   e. said boss of each said valve member abutting said first section of its adjacent retainer when said valve members are in the open position for preventing fluttering thereof; and
   f. means mounted on said second section of said retainer for biasing each said valve member to the closed position.

4. A check valve for use in fluid flow ducts as claimed in claim 3, wherein said biasing means mounted on the second section of said retainer is a torsion spring.

5. A check valve for use in fluid flow ducts as claimed in claim 3, wherein each said retainer comprises a wire member configured to have a first linear section for mounting it on said body member and a second linear section lying beyond said first section away from said body member and parallel to said first section, said second section having a portion extending prependicularly therefrom and engaging said body member for preventing rotation of said retainer about said first section mounting the retainer on said body.

* * * * *